(12) United States Patent
Park

(10) Patent No.: US 9,318,994 B2
(45) Date of Patent: Apr. 19, 2016

(54) MULTISTAGE VERTICAL SOLAR MODULE HOLDER

(71) Applicant: Jae Taek Park, Seoul (KR)

(72) Inventor: Jae Taek Park, Seoul (KR)

( * ) Notice: Subject to any disclaimer, the term of this patent is extended or adjusted under 35 U.S.C. 154(b) by 0 days.

(21) Appl. No.: 14/546,345

(22) Filed: Nov. 18, 2014

(65) Prior Publication Data

US 2015/0136208 A1 May 21, 2015

(30) Foreign Application Priority Data

Nov. 19, 2013 (KR) .......................... 10-2013-0140366

(51) Int. Cl.
*F24J 2/52* (2006.01)
*H02S 20/22* (2014.01)
*F24J 2/00* (2014.01)

(52) U.S. Cl.
CPC ................. *H02S 20/22* (2014.12); *F24J 2/523* (2013.01); *F24J 2/525* (2013.01); *F24J 2/526* (2013.01); *F24J 2/5233* (2013.01); *F24J 2002/0084* (2013.01); *Y02B 10/10* (2013.01); *Y02B 10/20* (2013.01); *Y02E 10/47* (2013.01)

(58) Field of Classification Search
CPC ......... H02S 20/00; H02S 20/26; H02S 20/22; F24J 2/523; F24J 2/5232; F24J 2/5233; F24J 2002/0084; Y02E 10/47
See application file for complete search history.

(56) References Cited

U.S. PATENT DOCUMENTS

| | | | | |
|---|---|---|---|---|
| 514,669 | A * | 2/1894 | Allingham | F24J 2/12 126/605 |
| 4,120,282 | A * | 10/1978 | Espy | F24J 2/16 126/684 |
| 4,480,633 | A * | 11/1984 | Farrell | F24J 2/0444 126/569 |
| 2010/0101559 | A1 * | 4/2010 | Grant | F24J 2/542 126/600 |
| 2012/0111318 | A1 * | 5/2012 | Park | F24J 2/541 126/605 |
| 2012/0267328 | A1 * | 10/2012 | McPheeters | H01L 31/0422 211/41.1 |
| 2014/0318599 | A1 * | 10/2014 | Kim | F24J 2/5406 136/246 |

FOREIGN PATENT DOCUMENTS

| | | | | |
|---|---|---|---|---|
| DE | WO 9220893 | A1 * | 11/1992 | ............... E06B 9/24 |
| EP | 0076455 | A2 * | 4/1983 | ............. F24J 2/5232 |
| ES | WO 2013068618 | A1 * | 5/2013 | ............... F24J 2/542 |
| FR | 2857997 | A1 * | 1/2005 | ................ F24J 2/52 |

(Continued)

*Primary Examiner* — Christine T Cajilig
(74) *Attorney, Agent, or Firm* — Rabin & Berdo, P.C.

(57) ABSTRACT

The present invention relates to a multistage vertical solar module holder. According to the present invention, because solar modules are installed between vertical members vertically installed on the bottom surface in a ladder type in multiple stages to be inclined by inclination maintenance units, a large number of solar cell modules can be installed in a single area and a large number of modules can be installed in a plurality of rows. Further, a shadow of an upper module does not hide a lower module by maintaining the vertical interval of the modules sufficiently, and the holders can be installed while rows of modules and the sunlight irradiation angle can be sufficiently maintained, so that high efficiency of solar power generation can be realized. In addition, because several rows of solar modules are installed in multiple stages by utilizing a vertical space for the solar module on the ground such as a rice paddy, a field or a forest, solar power generation can be realized together with farming, which helps the economy of farms. Further, because the solar modules can be installed in a narrow place such as the side of a road, the side of a railroad, and a bank, a new economic effect can be obtained.

10 Claims, 16 Drawing Sheets

(56) References Cited

FOREIGN PATENT DOCUMENTS

| | | | | |
|---|---|---|---|---|
| IT | EP 2515347 A1 * | 10/2012 | ............. | F24J 2/5237 |
| IT | EP 2645013 A1 * | 10/2013 | ............. | F24J 2/5233 |
| KR | 10-0121447 B1 | 7/1996 | | |
| KR | 20-0403785 Y1 | 12/2005 | | |
| KR | 10-2010-0086626 A | 8/2010 | | |
| KR | 10-2013-0006778 A | 1/2013 | | |
| NL | WO 2013036112 A1 * | 3/2013 | ............. | F24J 2/0444 |
| WO | WO 2010006007 A1 * | 1/2010 | ............. | E04F 10/02 |

\* cited by examiner

MULTISTAGE VERTICAL SOLAR MODULE HOLDER

BACKGROUND OF THE INVENTION

1. Field of the Invention

The present invention relates to a multistage vertical solar module holder, and, more particularly, to a holder for installing a large number of solar modules in multiple stages in a single area.

2. Description of the Prior Art

Nowadays, world energy consumption is increasing every year, and the amount of greenhouse gases in proportion to consumption of energy is also rapidly increasing due to the use of energy. Accordingly, development of environment-friendly alternative energy sources has been a main interest in energy policies of many nations, and the necessity and importance of developing alternative energy has been spotlighted every year. In this trend, in recent years, among alternative energies, energy technologies using solar energy which is a pollution-free energy source that can be easily secured has been actively studied.

Such a solar energy apparatus corresponds to a technology (photoelectric effect) for directly converting solar energy into electrical energy, and includes a solar cell module, a battery, and an inverter to use the clean energy source of sunlight without limit In this way, the solar power generation requires a structure for installing a solar cell module and a module clamp, and a durable and firm coupling structure by which the apparatus can endure for a long period of time of 20 to 30 years are essential to the structure and the module clamp to stably install a solar cell module.

In order to install the solar module, the following patents were designed: Korean Patent Application Publication No. 10-2010-0086626 (entitled "Apparatus for Holding a Light Condensing Plate for Solar Power Generation"), Korean Patent Application Publication No. 10-201300006778 (entitled "Solar Cell Module Holder"), Korean Patent No. 10-121447 (entitled "Solar Power Generation Facility"), and Korean Utility Model No. 20-0403785 (entitled "Solar Cell Module Holder").

According to the prior arts, because a solar module is fixedly installed transversely on a plane such as the ground or the roof of a building to be inclined, a large area is necessary for installation as the solar module occupies a large area, and accordingly, it cannot be installed on a vertical wall of a tall building such as an apartment or an office building so it cannot utilize a vertical space.

In addition, when solar modules are installed in rice paddies, fields, or forests, sunlight may be completely shielded by holders. Further, because holders are horizontally installed on the ground surface, rice paddies cannot be utilized at all. Furthermore, solar modules cannot be utilized in narrows places such as on the side of roads, side of railroads, or banks.

SUMMARY OF THE INVENTION

The present invention has been made in an effort to solve the above-mentioned problems, and provides a multistage vertical solar module holder which is installed in multiple stages in a vertical space such that a large number of solar modules may be installed.

The present invention also provides a multistage vertical solar module holder by which solar modules are installed on vertical walls of an apartment or a tall building which have not been utilized for low efficiency to produce electricity and vertical walls can be utilized for spaces for external appearances of the city.

The present invention also provides a multistage vertical solar module holder in which main frames are installed on the ground in places such as a rice paddy, a field or a forest to be inclined, auxiliary frames are vertically supported by rear sides of the main frames, and solar modules are installed in the main frames in multiple stages, so that the farm land can be utilized and electricity can be produced at the same time.

The present invention also provides a multistage vertical solar module holder which can utilize land which has not been used for solar power generation by utilizing a narrow place such as the side of a road, the side of a railroad or a bank.

In order to accomplish these objects, there is provided a multistage vertical solar module holder including: a plurality of vertical frames vertically fixed at the bottom while lower ends thereof are spaced apart from each other at equal intervals; a plurality of upper transverse supports coupled in multiple stages between the vertical frames to be transversely separated from the vertical frames; a plurality of horizontal supports coupled between the vertical frames in lower areas of the upper transverse supports and in front areas of the vertical frames to be horizontally separated from the vertical frames, and assembled in rectangular forms to define four-sided spaces therein, respectively; and a plurality of solar modules mounted between the upper transverse supports and the lower horizontal supports such that upper and to lower portions thereof are inclined at 60° and 30° by inclination maintenance units 50, respectively so that an interval is maintained between the solar modules such that a shadow of an upper module does not hide a lower module.

In accordance with another aspect of the present invention, there is provided a multistage vertical solar module holder including: a pair of supports buried under the ground surface; a pair of main frames installed at upper portions of front surfaces of the supports to be inclined at 20 to 30° rearwards with respect to a line perpendicular to the ground surface, respectively; a pair of auxiliary frames of which lower portions and upper portions are fixed between upper portions of rear surfaces of the supports and the main frames, for supporting the main frames, respectively; a plurality of horizontal supports installed between the front surfaces of the main frames to maintain the same interval and the same angle; and a plurality of solar modules coupled to upper surfaces of the horizontal supports at 60° to be separated from the horizontal supports, respectively so that an interval is maintained between the solar modules such that a shade of an upper module does not hide a lower module.

According to the present invention, because solar modules are installed between vertical members vertically installed on the bottom surface in a ladder type in multiple stages to be inclined by inclination maintenance units, a large number of solar cell modules can be installed in a single area and a large number of modules can be installed in a plurality of rows. Further, because solar power generation can be realized on a vertical wall of an apartment or a tall building which is not suitable for installation of a solar module by utilizing the technology, new economic value can be created.

Moreover, according to the present invention, because main frames are installed on the ground in places such as a rice paddy, a field, or farmland to be inclined at 20 to 30° with respect to a line perpendicular to the ground surface, auxiliary frames are vertically supported by a rear side of the main frames, several rows of solar modules can be installed in multiple stages by utilizing a vertical space of the solar modules, and solar power generation can be realized at a high efficiency. Further, because the vertical interval of the module is maintained sufficiently and the shadow of an upper module does not hide the lower module, and several solar modules can be installed in a holder while maintaining a sunlight irradiation angle, efficiency can be increased and farmland can be maximally utilized, so that solar power generation can be realized together with farming, which helps the economy of farms.

In addition, because a solar module can be installed in a narrow place such as the side of a road, the side of a railroad, and a bank by utilizing the holder, a new economic effect can be obtained.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings.

Figure 1:
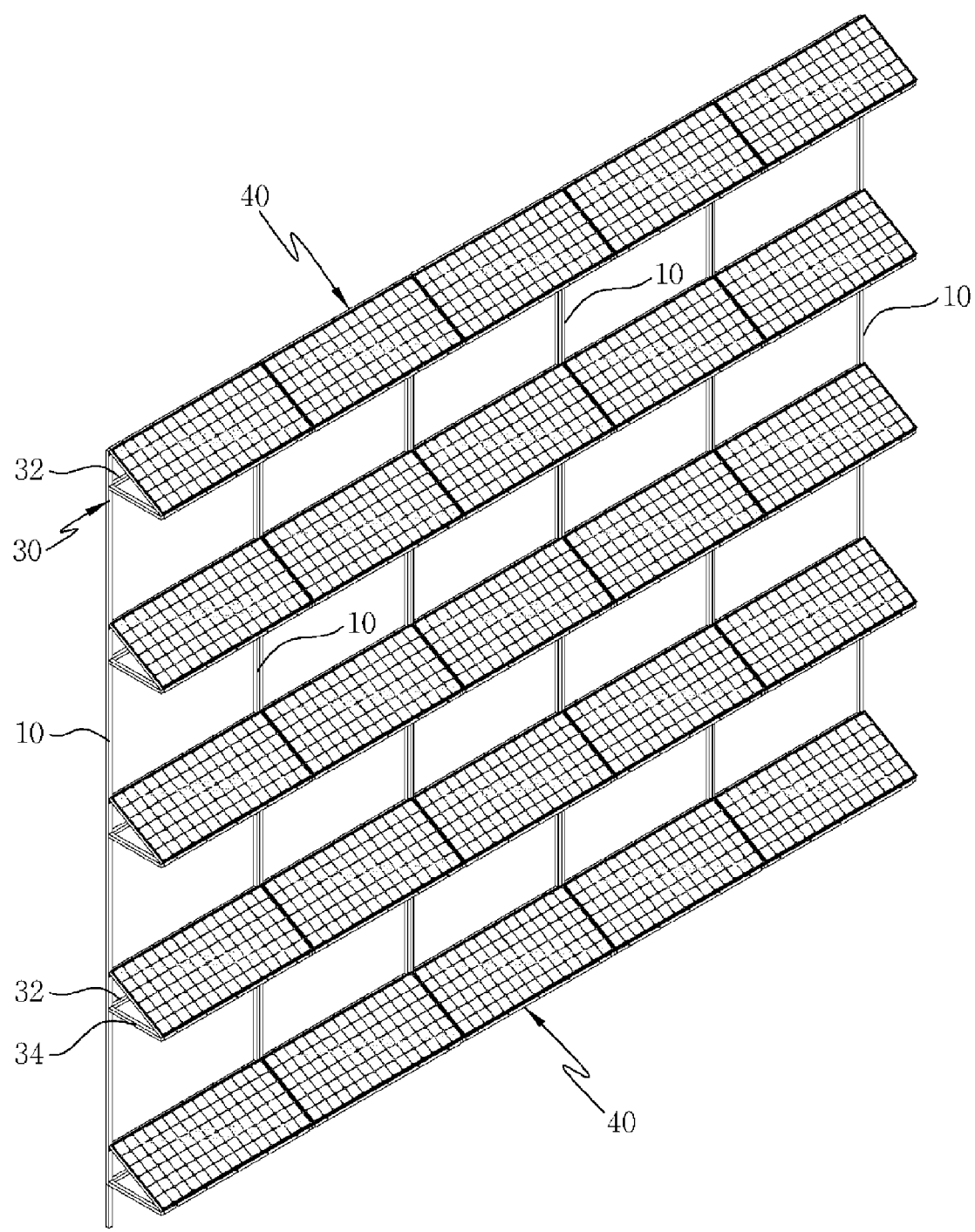
FIG. 1 is a perspective view of a multistage vertical solar module holder according to a first embodiment of the present invention.
Figure 2:
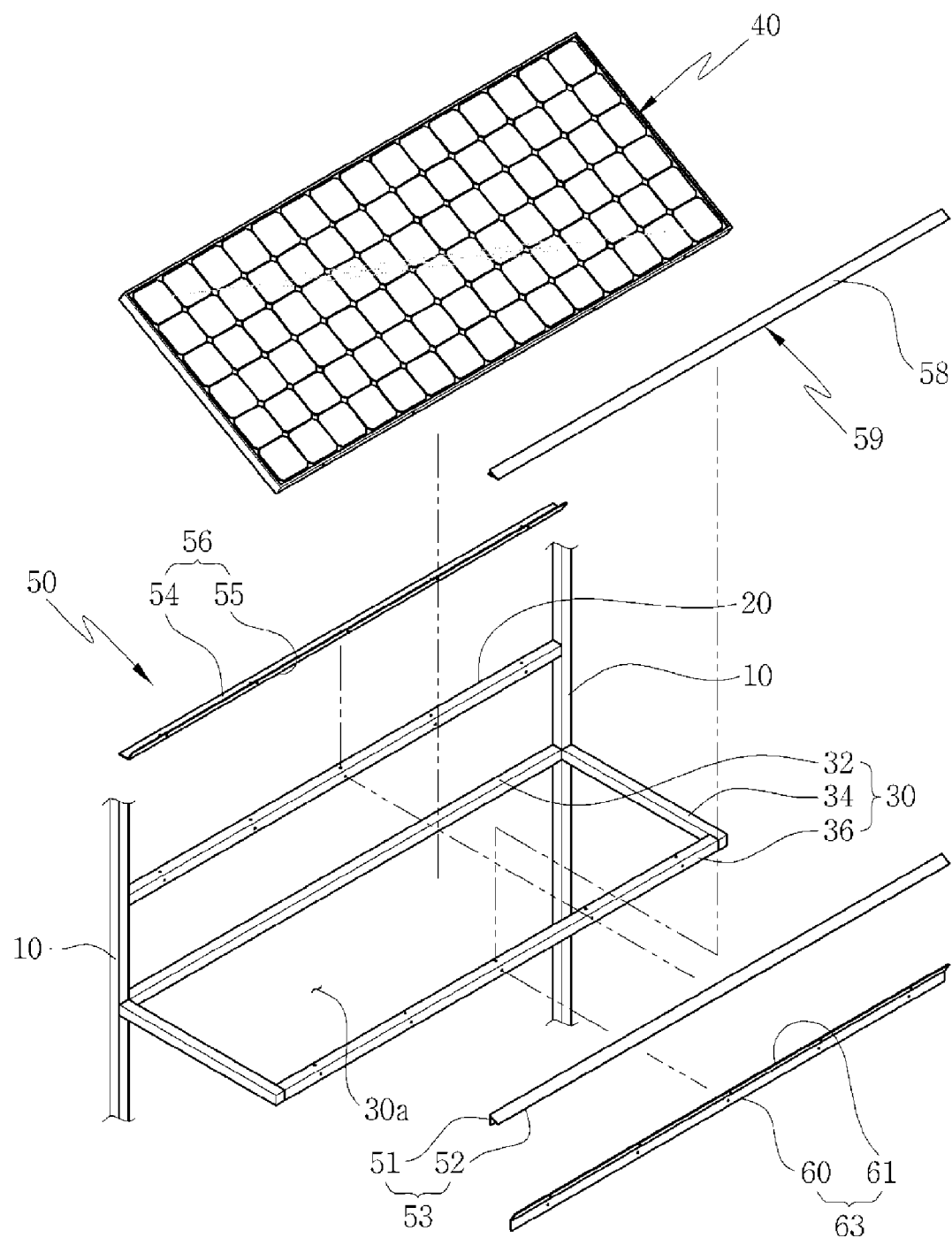
FIG. 2 is an exploded perspective view of a main part of FIG. 1.
Figure 3:
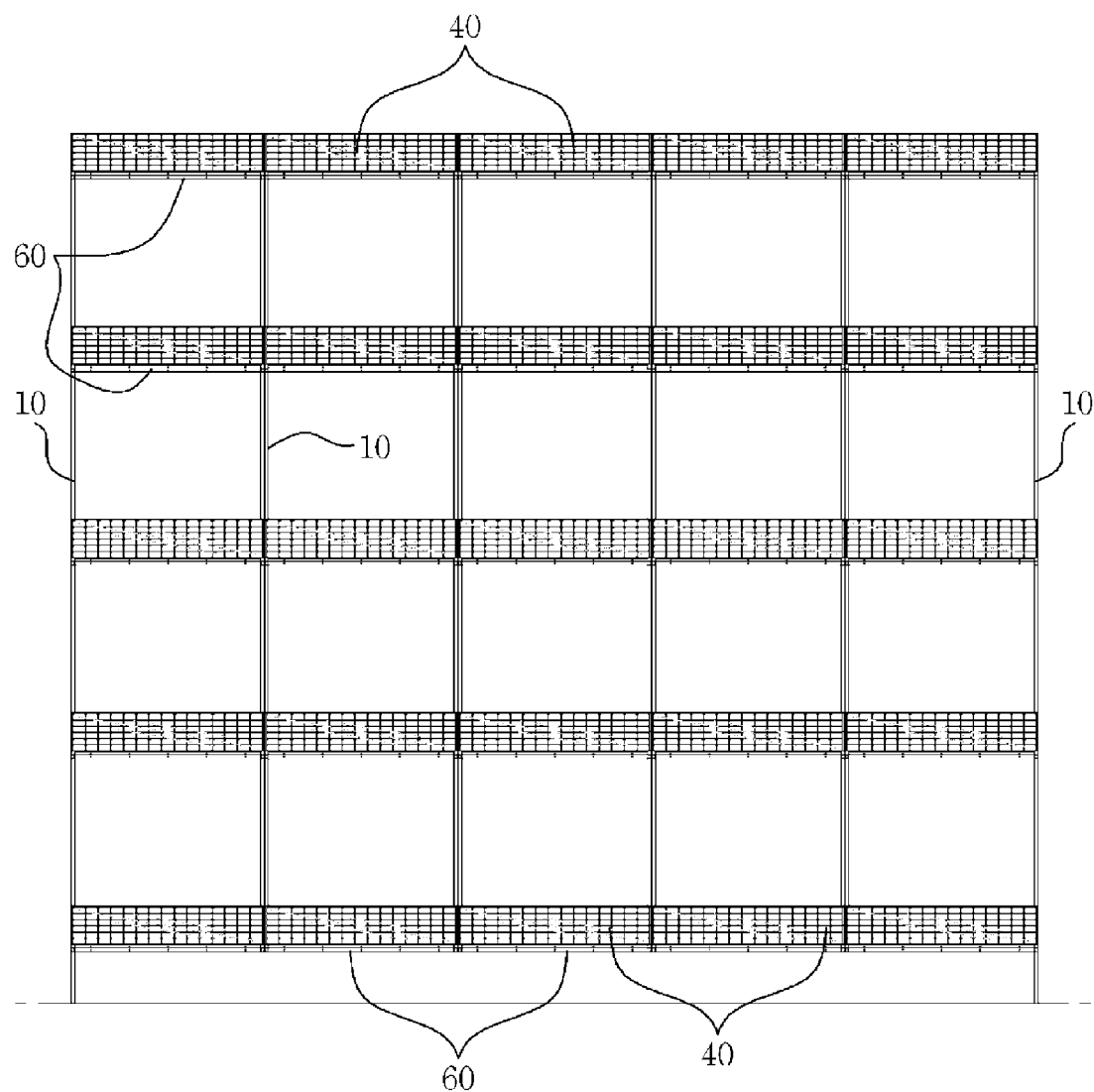
FIG. 3 is a front view of FIG. 1.
Figure 4:
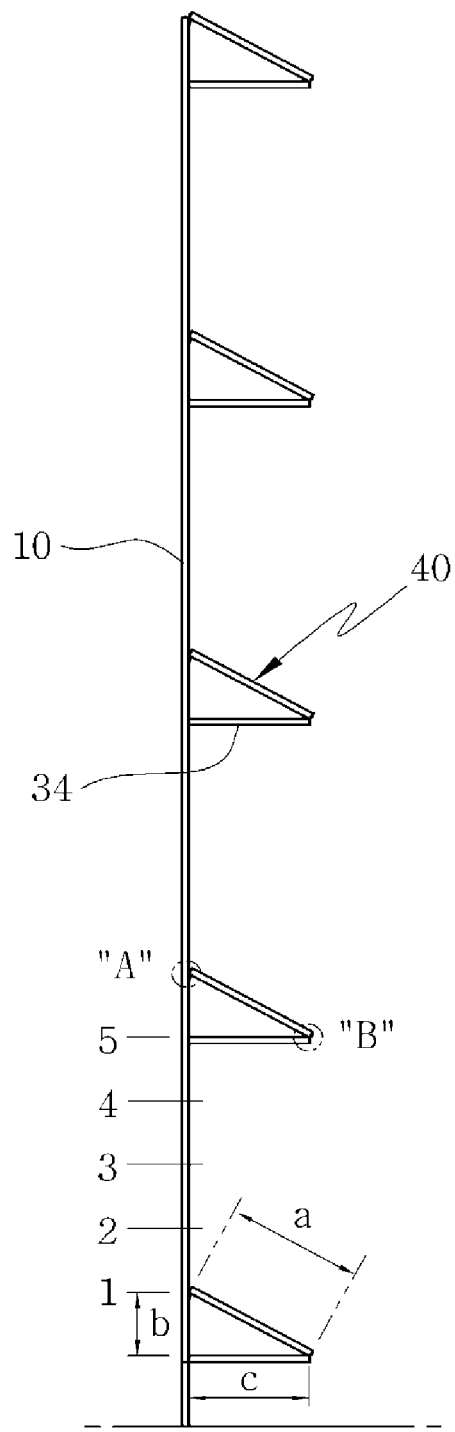
FIG. 4 is a side view of a main part of the multistage vertical solar module holder according to the first embodiment of the present invention.
Figure 5:
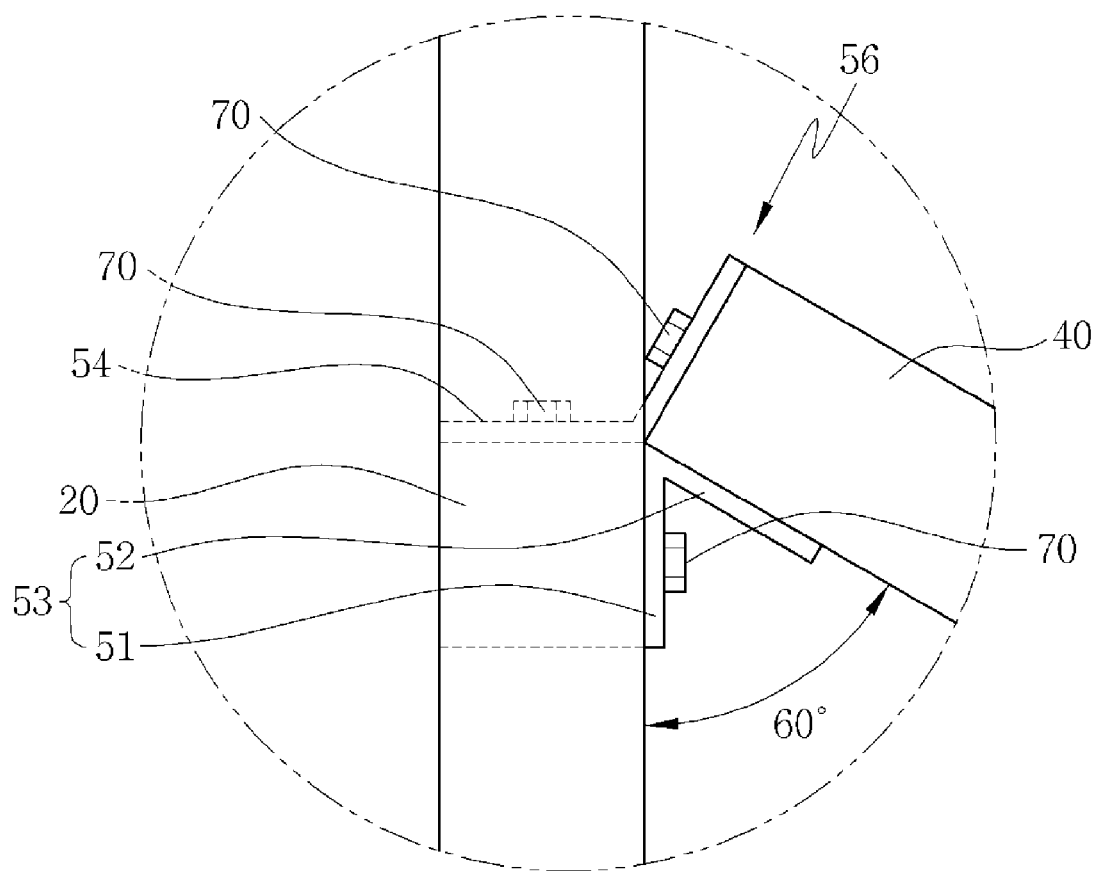
FIGS. 5 and 6 are enlarged views of section A and section B of FIG. 4.
Figure 6:
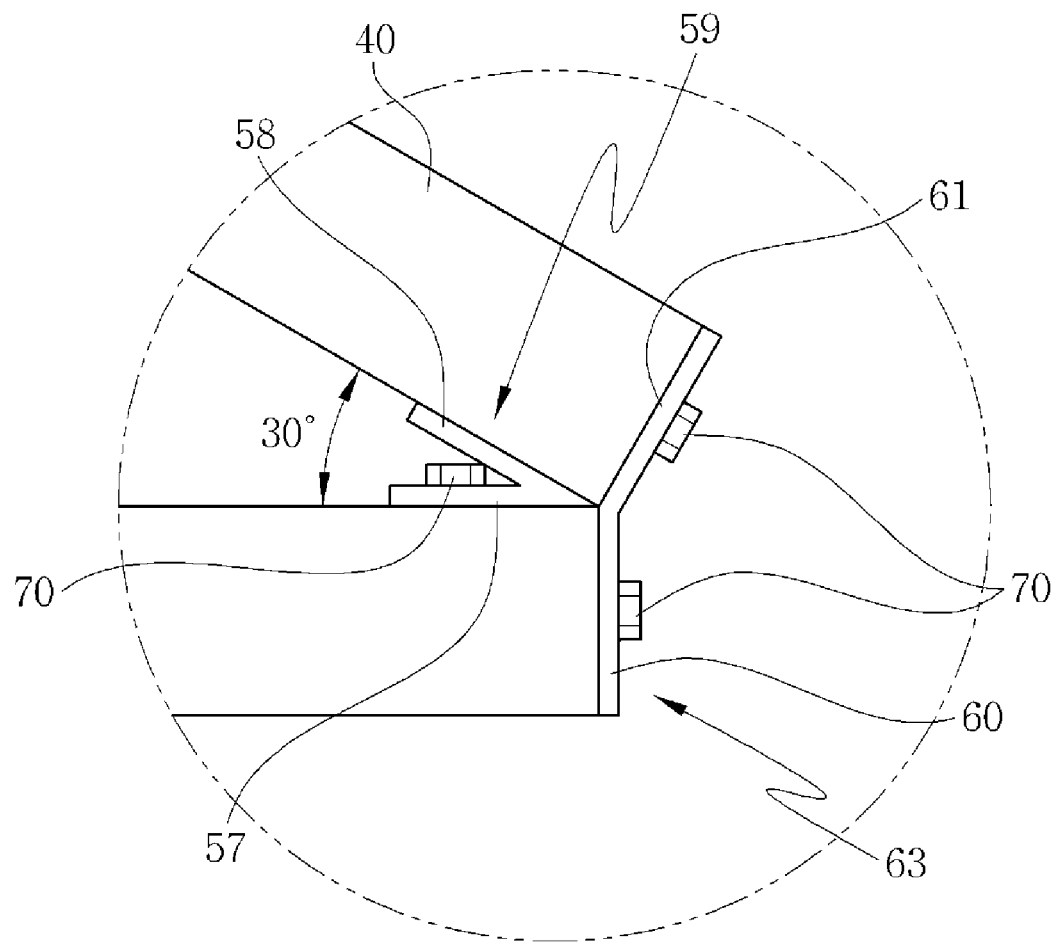

FIG. 1 is a perspective view of a multistage vertical solar module holder according to a first embodiment of the present invention. FIG. 2 is an exploded perspective view of a main part of FIG. 1. FIG. 3 is a front view of FIG. 1. FIG. 4 is a side view of a main part of the multistage vertical solar module holder according to the first embodiment of the present invention. FIGS. 5 and 6 are enlarged views of section A and section B of FIG. 4.

As shown in FIGS. 1 to 6, the multistage vertical solar module holder according to the first embodiment of the present invention includes: a plurality of vertical frames 10 vertically fixed to the bottom while lower ends thereof are spaced apart from each other at equal intervals; a plurality of upper transverse supports 20 coupled in multiple stages between the vertical frames 10 to be horizontally separated from the vertical frames 10; a plurality of horizontal supports 30 coupled between the vertical frames 10 in lower areas of the upper transverse supports 20 and in front areas of the vertical frames 10 to be horizontally separated from the vertical frames 10, and assembled in rectangular forms to define four-sided spaces 30a therein, respectively; and a plurality of solar modules 40 mounted between the upper transverse supports 20 and the lower horizontal supports 30 to be inclined at 30° by inclination maintenance units 50, respectively.

The upper transverse supports 20 are installed between the vertical frames 10 to be separated from the vertical frames 10 while maintaining equal intervals, and transversely divide the plurality of vertical frames 10 in multiple stages and support the plurality of vertical frames 10.

The lower horizontal support 30 includes an inner fixed part 32 coupled between the vertical frames 10 in a lower area of the upper transverse support 20 such that opposite ends thereof may be separated, a pair of horizontal fixed parts 34 coupled to front sides of the vertical frames 10 to be horizontally and vertically separated and protruding to the outside; and an outer fixed part 36 coupled to front sides of the horizontal fixed parts 34 to be separated from the horizontal fixed parts 34, and a four-sided space 30a is defined in the lower horizontal support 30.

The inclination maintenance unit 50 includes: a lower inclined bracket 53 including a vertical coupling piece 51 fixedly coupled to a front surface of the upper transverse support 20 transversely by a coupling bolt 70 and a lower inclined piece 52 integrally formed with the vertical coupling piece 51 to be inclined by 60° from an upper end of the vertical coupling piece 51 to a lower side, for supporting an upper portion of the solar cell module 40; an upper inclined bracket 56 including a horizontal coupling piece 54 fixedly coupled to an upper surface of the upper transverse support 20 transversely by a coupling bolt 70 and an upper inclined piece 55 integrally formed with an end of the horizontal coupling piece 54 to be inclined and fixedly coupled to an upper end of the solar module 40 by a coupling bolt 70; an inner inclined bracket 59 including an inner horizontal piece 57 fixedly coupled to an upper portion of the outer fixed part 36 of the lower horizontal support 30 transversely by a coupling bolt 70 and an inner inclined piece 58 inclined by 30° from an end of the inner horizontal piece 57 to an upper side, for supporting a lower portion of the solar module 40; and an outer inclined bracket 63 including an outer vertical piece 60 fixedly coupled to a front surface of the outer fixed part 36 transversely by a coupling bolt 70 and an outer inclined piece 61 integrally formed with an upper portion of the outer vertical piece 60 and fixedly coupled to a front surface of the solar module 40 by a coupling bolt 70.

Meanwhile, the solar module 40 is installed between the upper transverse support 20 to and the lower horizontal support 30 such that an inclination angle of an upper portion of the solar module 40 is maintained at 60° by the lower inclined bracket 53 and the upper inclined bracket 56 and an inclination angle of a lower portion of the solar module 40 is maintained at 30° by the inner inclined bracket 59 and the outer inclined bracket 63.

Then, as shown in FIG. 4, when it is assumed that the length (the inclined edge of a triangle) of the solar module 40 installed on an incline between the upper transverse support 20 and the lower horizontal support 30 is a, the vertical height (the height of the triangle) of the solar module 40 installed at an inclination angle of 30° is b, and the protrusion length (the bottom edge of the triangle) of the lower vertical support 30 by which a lower end of the solar module 40 is supported is c, $\sqrt{a^2 b^2} = c$.

Here, a is 2, b is 1, and c is $\sqrt{3}$.

The vertical interval AB of the solar modules 40 installed in multiple stages between the vertical frames 10 is five to six times as high as the vertical height (the height of the triangle: b) of the solar modules 40 installed on an incline such that the shadow of an upper module does not hide a lower module.

Figure 7:
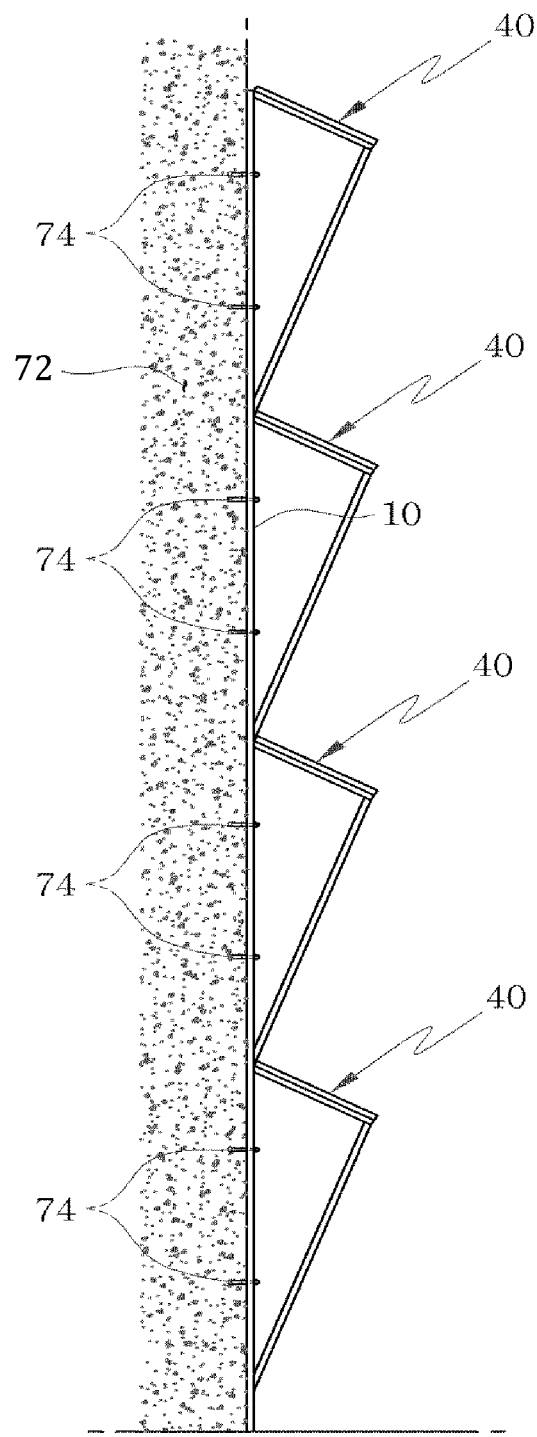
FIG. 7 is a diagram of another example of the multistage vertical solar module holder according to the first embodiment of the present invention.

Meanwhile, the holder shown in FIG. 7 is adapted to utilize a vertical space by installing solar modules on a vertical wall 72 of an apartment or a tall building with anchor bolts 74 using the principle of a multistage vertical solar module holder.

Figure 8:
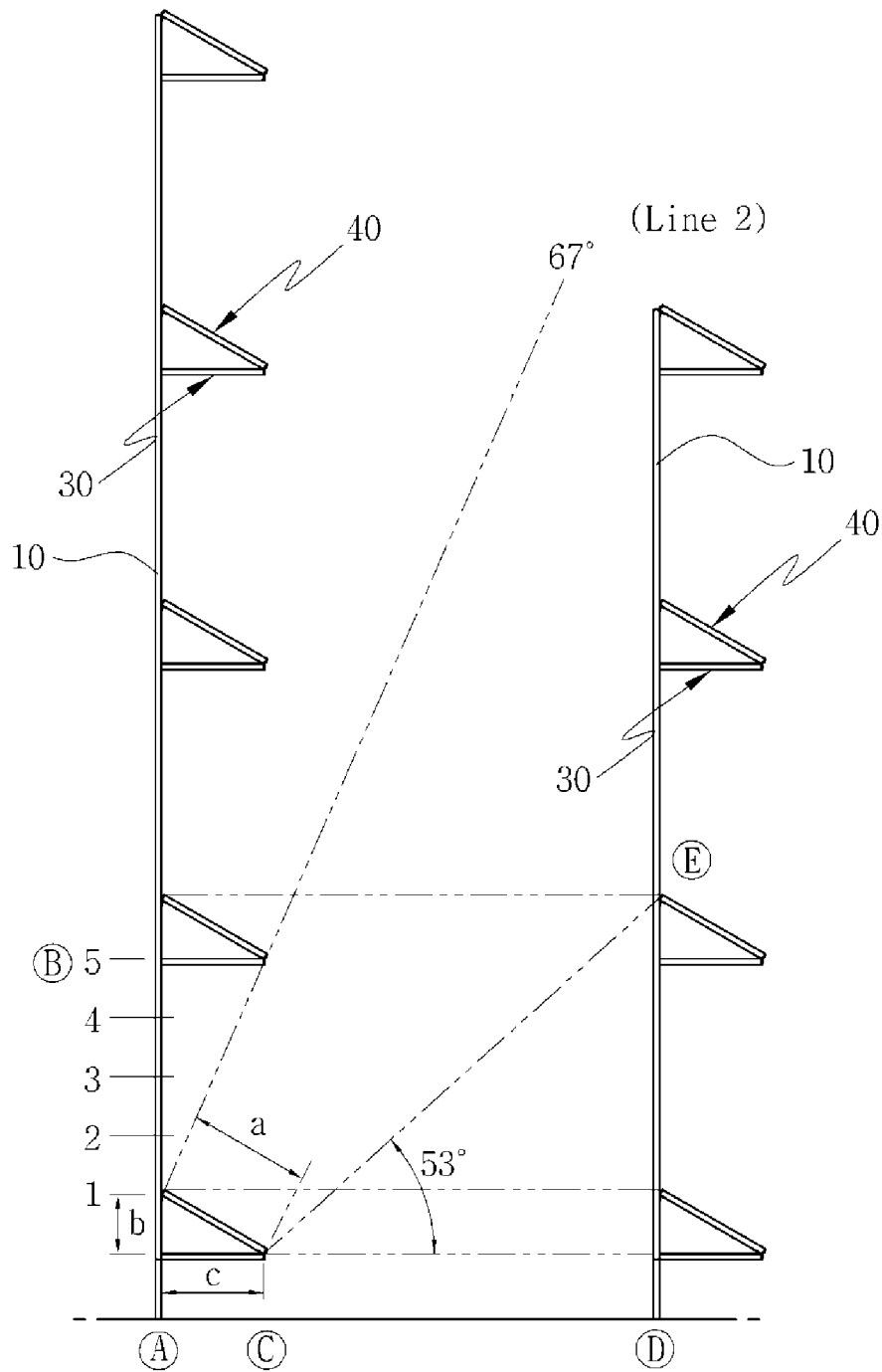
FIG. 8 is a diagram of another example of the multistage vertical solar module holder according to the first embodiment of the present invention.

As shown in FIG. 8, a plurality of rows of multistage vertical solar module holders are installed, an interval (A+C+D) of the holders in the first row and the holders in the second rows is (3c+5b)(n−1), where n denotes the number of rows of holders, and the interval (A+C+D) is $\{(\sqrt{3} \times 3) + (5 \times 1)\}(2-1) = 10.19$ and the interval in the case of three rows of holders is $\{(\sqrt{3} \times 3) + (5 \times 1)\}(3-1) = 20.39$.

A sunlight irradiation angle between the first row and the second row of holders is maintained at 53° from the bottom surface if the interval (A+C+D) between the first row and the second row is maintained.

Figure 9:
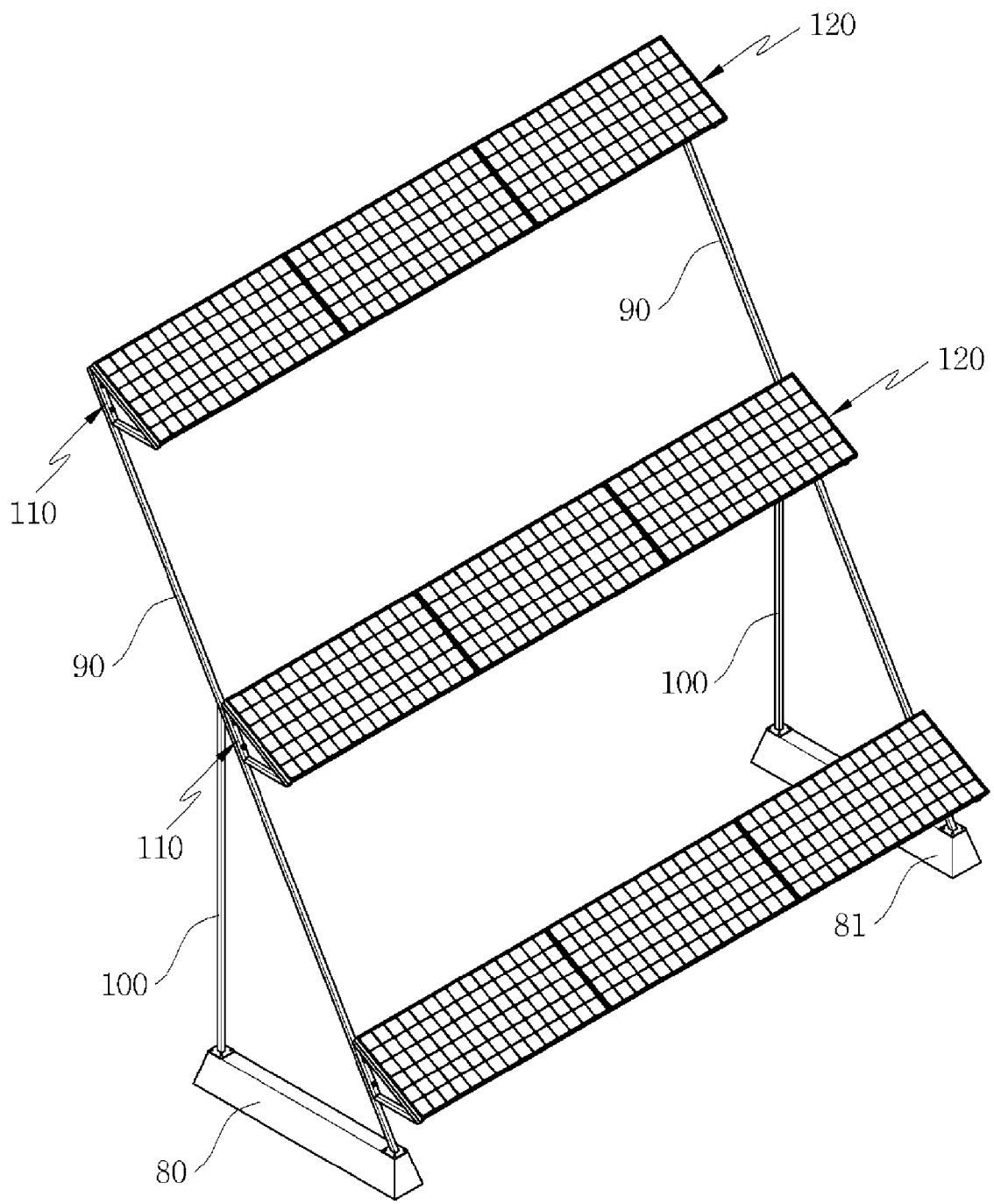
FIG. 9 is a perspective view of a multistage vertical solar module holder according to a second embodiment of the present invention.
Figure 10:
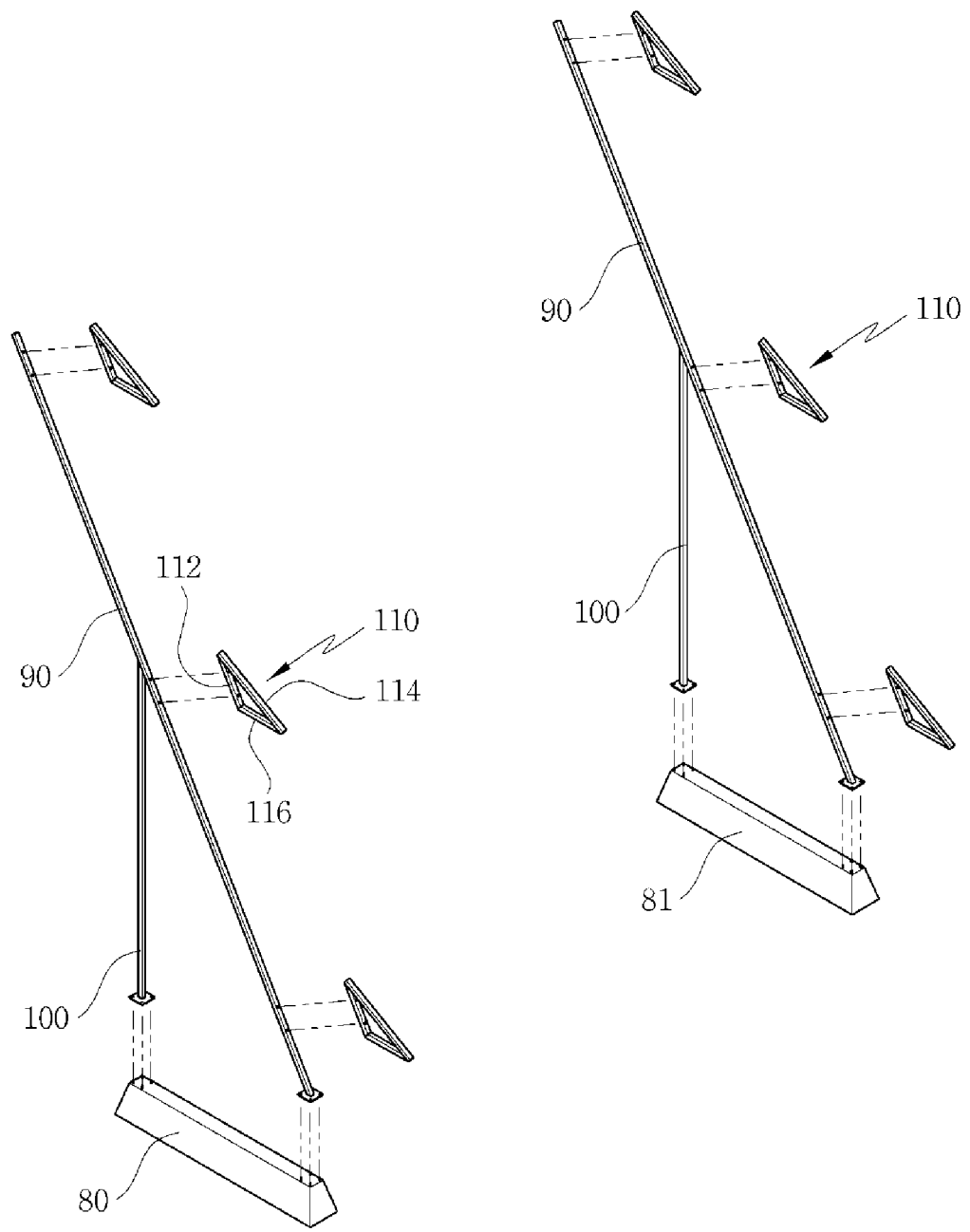
FIG. 10 is an exploded perspective view of a main part of FIG. 9.
Figure 11:
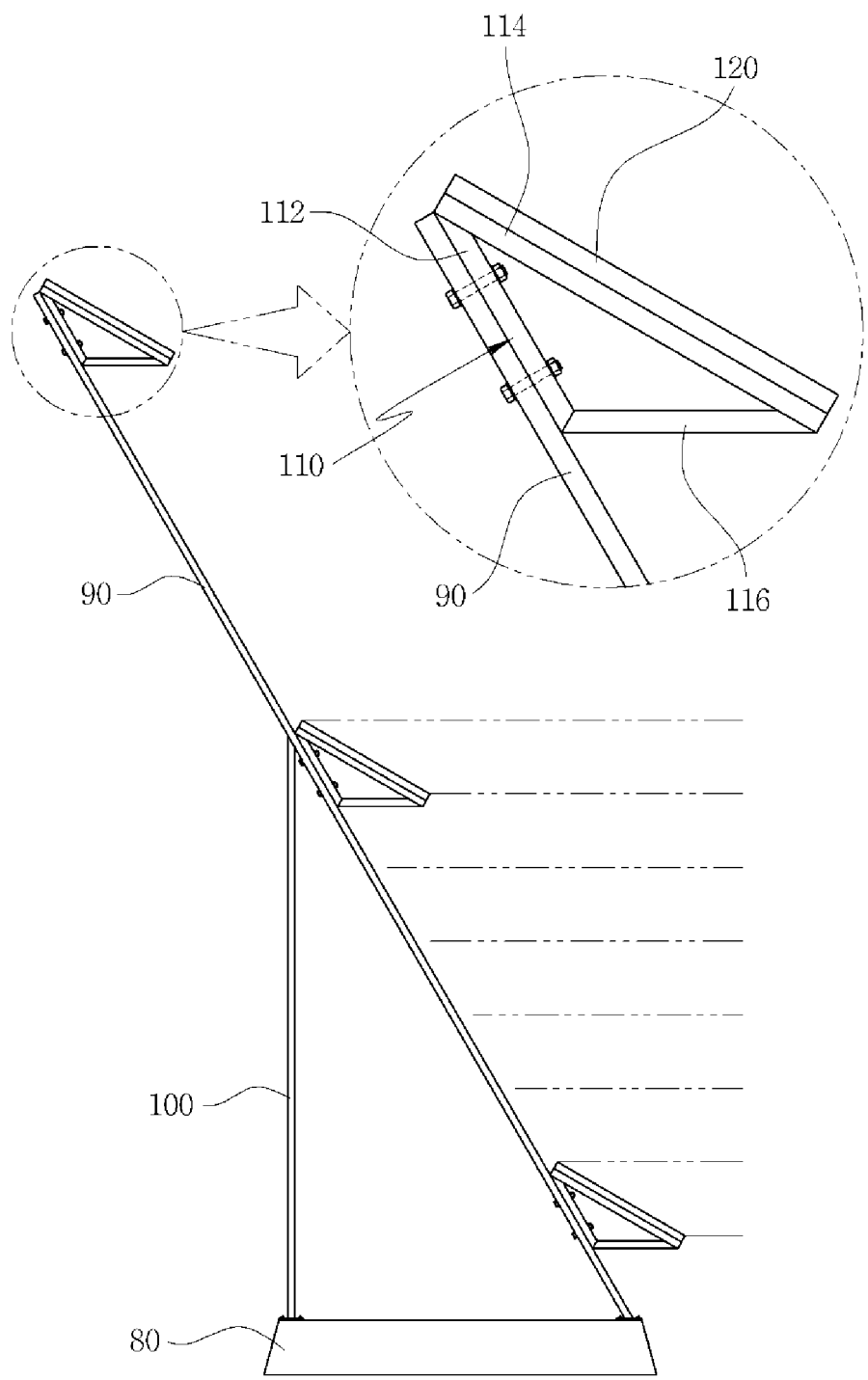
FIG. 11 is a side view of a main part of the multistage vertical solar module holder according to the second embodiment of the present invention.
Figure 12:
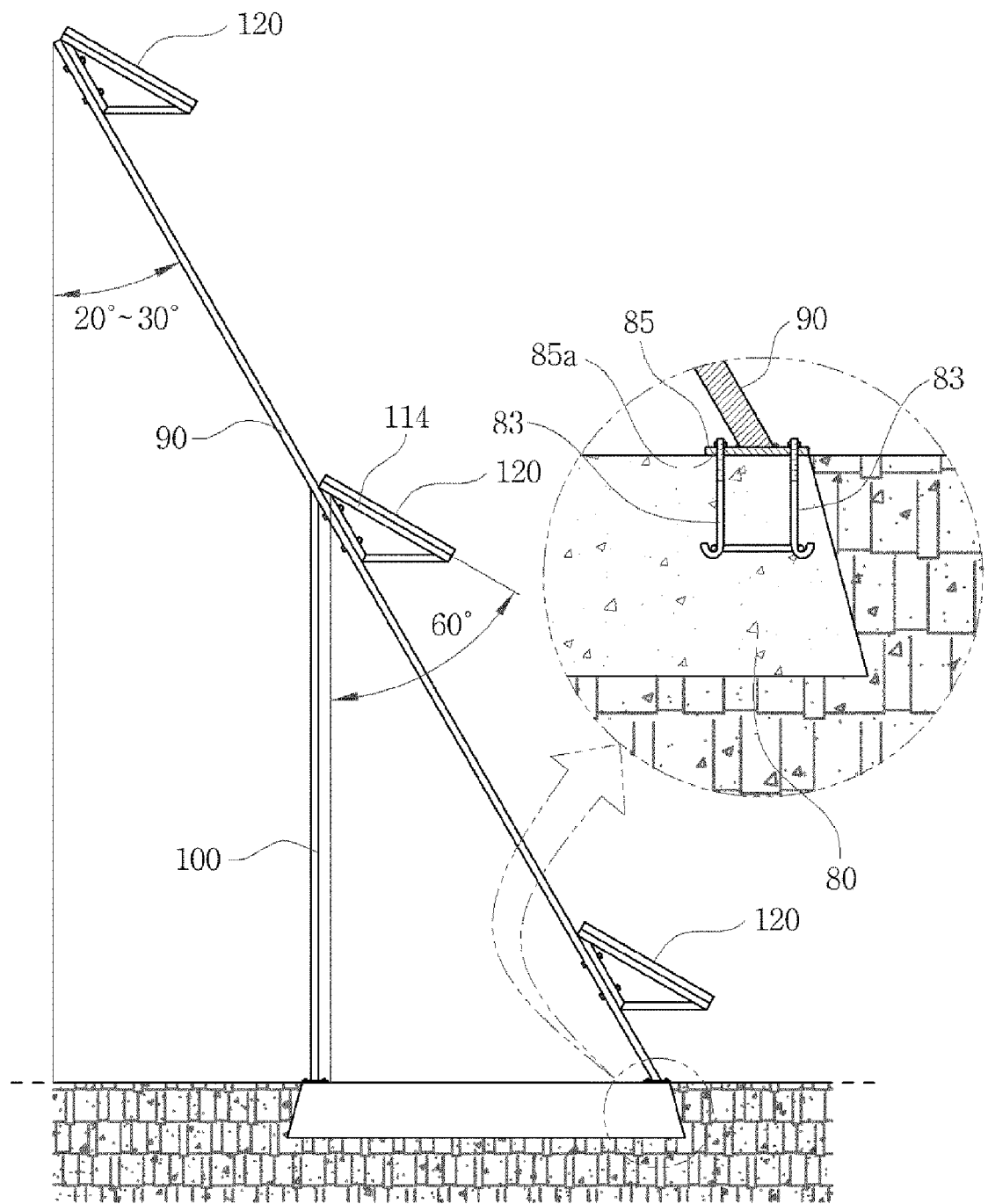
FIG. 12 is a diagram of an installation state of the multistage vertical solar module holder according to the second embodiment of the present invention.

FIG. 9 is a perspective view of a solar module holder according to a second embodiment of the present invention. FIG. 10 is an exploded perspective view of a main part of FIG. 9. FIG. 11 is a side view of a main part of the solar module holder according to the second embodiment of the present invention. FIG. 12 is a diagram of an installation state of to the multistage vertical solar module holder according to the second embodiment of the present invention.

As shown in FIGS. 9 to 12, the solar module holder according to the second embodiment of the present invention includes: a pair of supports 80 and 81 corresponding to concrete structures formed transversely and longitudinally and buried under the ground surface; a pair of main frames 90 installed at upper portions of front surfaces of the supports 80 and 81 to be inclined at 20 to 30° rearwards with respect to a line perpendicular to the ground surface, respectively; a pair of auxiliary frames 100 of which lower portions and upper portions are fixed between upper portions of rear surfaces of the supports 80 and 81 and the main frames 90, for supporting the main frames 90, respectively; a plurality of horizontal supports 110 installed between the front surfaces of the main frames 100 to maintain the same interval and the same angle; and a plurality of solar modules 120 coupled to upper surfaces of the horizontal supports 110 at 60° to be separated from the horizontal supports 110, respectively.

The supports 80 and 81 correspond to concrete structures, and the main frames 90 and the auxiliary frames 100 are fixedly coupled to the supports 80 and 81 by anchor bolts 83 to be separated from the supports 80 and 81 when the holder is manufactured.

Coupling pieces 85 having insertion holes 85a into which the anchor bolts 83 are inserted are fixed to lower ends of the main frames 90 and the auxiliary frames 100, such that lower ends of the main frames 80 are installed in the coupling pieces 85 to be inclined at 20 to 30°, respectively and lower ends of the auxiliary frames 100 are vertically installed.

The horizontal support 110 includes: a vertical part 112 coupled to a front surface of the main frame 90 installed in the support 80 and 81 to be inclined rearwards at 20 to 30°; an inclined part 114 integrally formed with an upper portion of an upper end of the vertical part 112 to be inclined downwards at 60° with respect to a line perpendicular to the ground surface; and an inclined connecting part 116 integrally formed with the vertical part 112 and the inclined part 114 between lower ends of the vertical part 112 and the inclined part 114.

An installation interval of the solar modules 120 coupled to upper surfaces of the to inclined parts 114 of the horizontal supports 110 to be inclined at 60° with respect to a line perpendicular to the ground surface is five to six times as high as the installation height of the solar modules 120 such that the shadow of an upper module does not hide a lower module.

Figure 13:
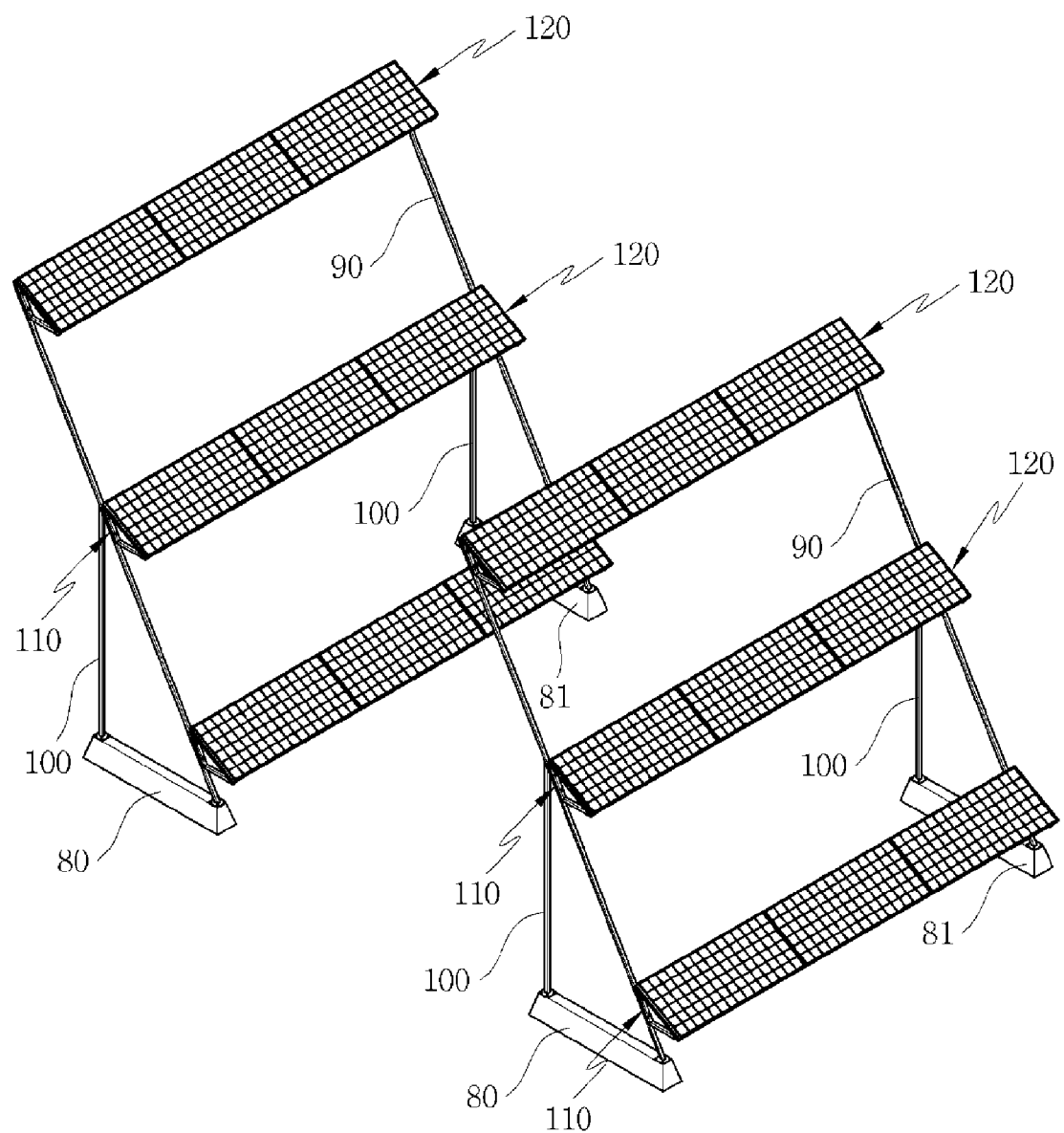
FIGS. 13 and 14 are diagrams of a state in which several rows of the multistage vertical solar module holders according to the second embodiment of the present invention are installed.
Figure 14:
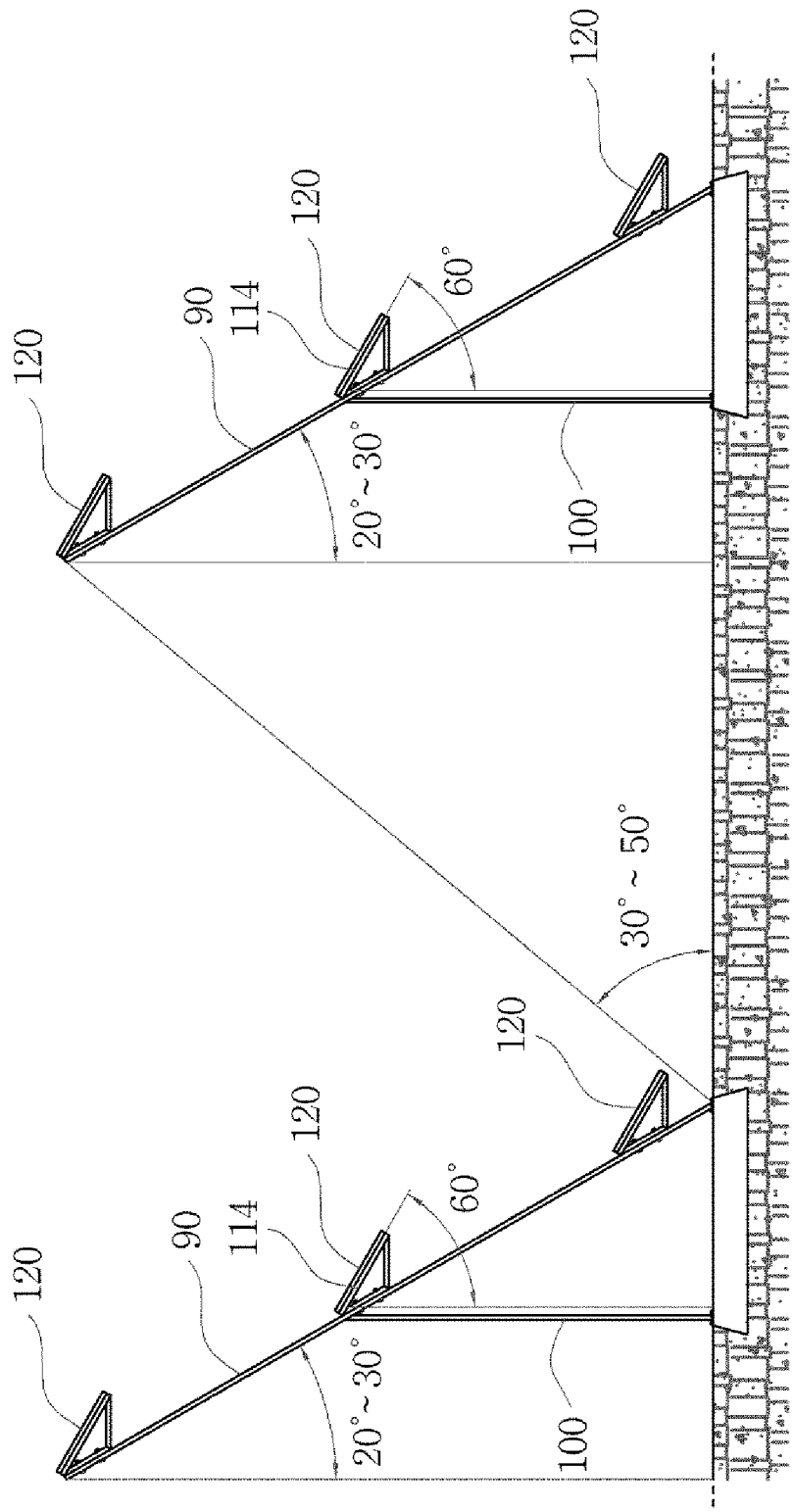

As shown in FIGS. 13 to 14, a plurality of rows of solar module holders are installed in farmland such as a rice paddy or a field, the interval between the first row and the second row is maintained such that an angle obtained by extending the solar module 120 installed at upper ends of the main frames 90 corresponding to the second row and lower ends of the main frames 90 corresponding to the first row is at 30 to 53° with respect to the ground surface.

Figure 15:
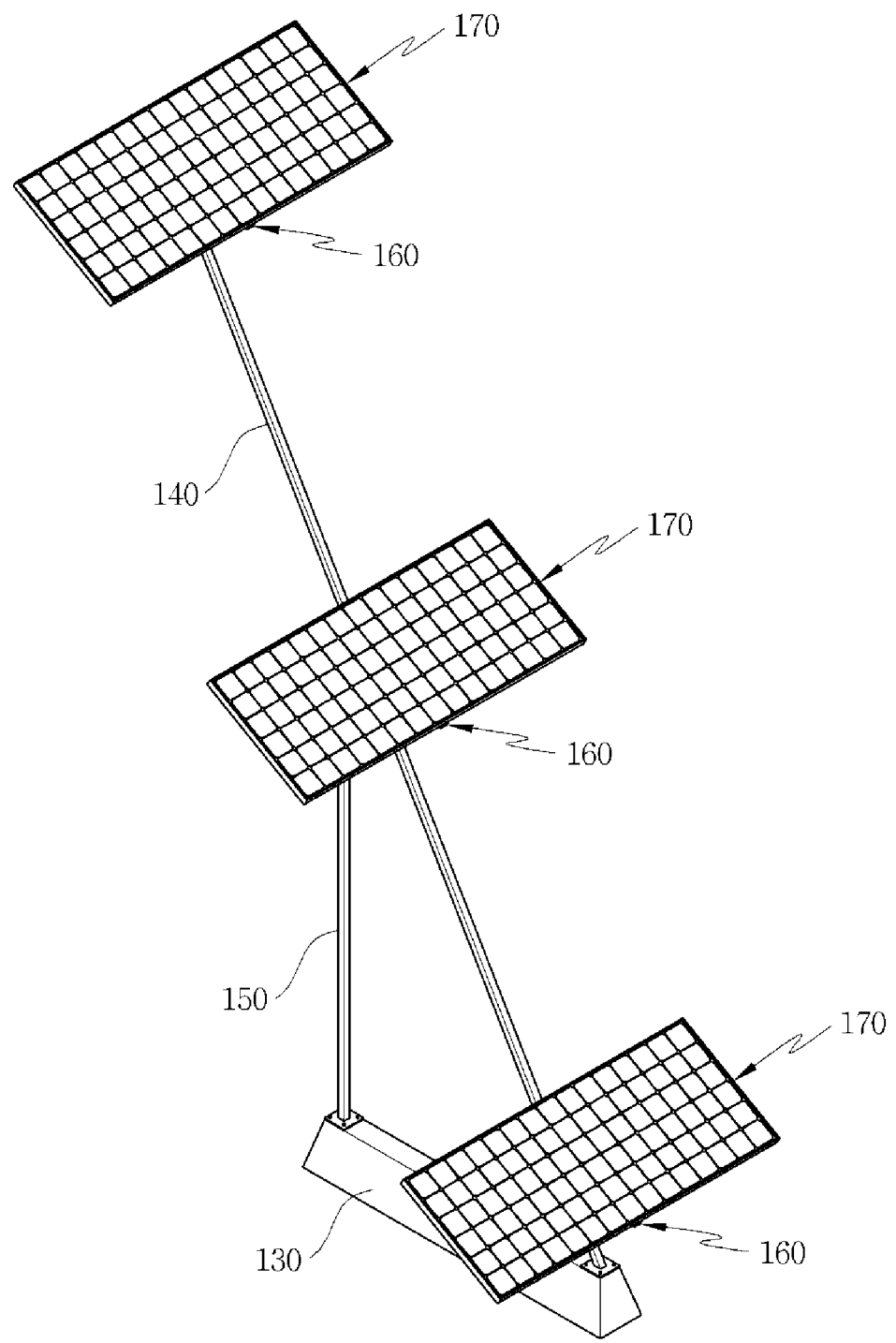
FIG. 15 is a diagram of another example of the multistage vertical solar module holder according to the second embodiment of the present invention.
Figure 16:
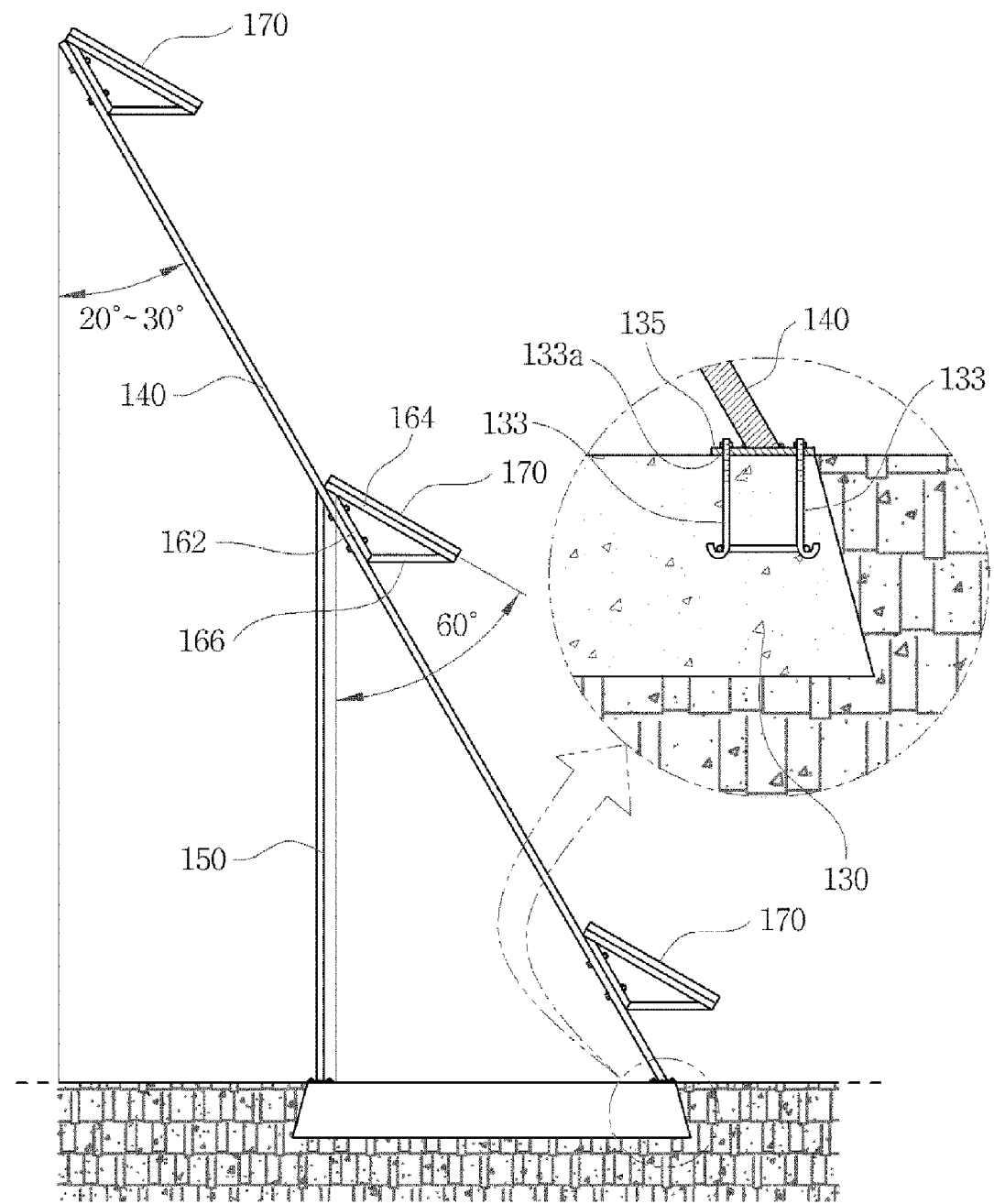
FIG. 16 is a diagram of an installation state of FIG. 15.

FIG. 15 is a diagram of another example of the multistage vertical solar module holder according to the second embodiment of the present invention. FIG. 16 is a diagram of an installation state of FIG. 15.

FIGS. 9 to 12 shows another example of the multistage vertical solar module holder according to the second embodiment of the present invention, and the same reference numerals denote the same constituent elements.

As shown in FIGS. 15 and 16, the multistage vertical solar module holder includes: a support 130 corresponding to a concrete structure and buried under the ground surface; a main frame 140 installed at an upper portion of a front surface of the support 130 such that a lower end thereof is inclined rearwards at 20 to 30° with respect to a line perpendicular to the ground surface; an auxiliary frame 150 of which a lower portion and an upper portion are fixed between an upper portion of the rear surface of the support 130 and the main frame 140, for supporting the main frame 140; a plurality of horizontal supports 160 installed on the front surface of the main frame 140 to maintain the same angle and the same interval; and a plurality of solar modules 170 coupled to the upper surfaces of the horizontal supports 160 at 60° to be separated from the horizontal supports 160.

The supports 130 correspond to concrete structures, and the main frames 140 and the auxiliary frames 150 are fixedly coupled to the supports 80 and 81 by anchor bolts 132 to be separated from the supports 130 when the holder is manufactured.

Coupling pieces 135 having insertion holes 133a into which the anchor bolts 133 are to inserted and fixed to lower ends of the main frames 140 and the auxiliary frames 150, such that lower ends of the main frames 140 are installed in the coupling pieces 135 to be inclined at 20 to 30°, respectively and lower ends of the auxiliary frames 150 are vertically installed.

The horizontal support 160 includes: a vertical part 162 coupled to a front surface of the main frame 140 installed in the support 130 to be inclined rearwards at 20 to 30°; an inclined part 164 integrally formed with an upper portion of an upper end of the vertical part 162 to be inclined downwards at 60° with respect to a line perpendicular to the ground surface; and an inclined connecting part 166 integrally formed with the vertical part 162 and the inclined part 164 between lower ends of the vertical part 112 and the inclined part 114.

An installation interval of the solar modules 170 coupled to upper surfaces of the inclined parts 164 of the horizontal supports 160 to be inclined at 60° with respect to a line perpendicular to the ground surface is five to six times as high as the installation height of the solar modules 170 such that the shadow of an upper module does not hide a lower module.

Another example of the multistage vertical solar module holder is configured such that the main frame 140 and the auxiliary frame 150 are installed at an upper portion of one support 130 to install a solar module 170 having a small size, the horizontal support 160 is installed to maintain an interval from the front surface of the main frame 140 and to be inclined, and the solar module 170 is installed in the horizontal support 160, so that a solar module may be installed in a narrow place.

An installation state of the solar module holder according to the first embodiment of the present invention will be described.

First, as shown in FIGS. 1 to 3, after the vertical frames 10 having the same length are prepared, the upper transverse supports 20 are coupled between the vertical frames 10 to be separated from the vertical frames 10 such that the holder is divided in multiple stages at the same interval.

In this state, after the lower horizontal supports 30 protrude to the outside between the vertical frames 10 below the upper transverse supports 20 to be sequentially assembled in a rectangular form, the solar modules 40 are sequentially assembled between the vertical to frames 10 below the upper transverse supports 20 to be inclined by the inclination maintenance units 50.

That is, an upper portion of the solar module 40 is supported to be inclined at 60° by the lower inclined piece 52 integrally formed with the vertical coupling piece 51, which is fixedly coupled to a front surface of the upper transverse support 20 by a coupling bolt 70, to be inclined at 60° from an upper end of the vertical coupling piece 51 to a lower side, and an upper end of the solar module 40 is fixedly coupled to the upper inclined piece 55 integrally formed with an end of the horizontal coupling piece 54 fixedly coupled to an upper surface of the upper transverse support 20 by a coupling bolt 70 to be inclined, by a coupling bolt 70 (see FIG. 5).

At the same time, a lower portion of the solar module 40 is supported to be inclined at 30° by an upper portion of the inner inclined piece 58 inclined upwards at 30° from an end of the inner horizontal piece 57 fixedly coupled to an upper portion of the outer fixed part 36 of the lower horizontal support 30 by a coupling bolt 70, and a lower end of the solar module 40 is fixedly coupled to the outer inclined bracket 63 integrally formed with an upper portion of the outer vertical piece 60 fixedly coupled to a front surface of the outer fixed part 36 by a coupling bolt 70, by a coupling bolt, whereby the solar module 40 is installed in the holder (see FIG. 6).

In this state, as the vertical frames 10 in which the solar modules 40 are installed in multiple stages are vertically installed in an installation place, the vertical space can be effectively utilized so that a large number of solar modules 40 can be installed in a unit area.

The vertical interval AB of the solar modules 40 installed in multiple stages between the vertical frames 10 is five to six times as high as the vertical height (the height of the triangle: b) of the solar modules 40 installed on an incline such that the shadow of an upper module does not hide a lower module.

Then, the vertical interval AB of the solar modules 40, that is, the interval between an upper module and a lower module is adjusted with reference to a meridian transit altitude of 67° (an average meridian transit altitude is 53°) at an altitude to of 37°.

Meanwhile, when a plurality rows of solar module holders are installed as shown in FIG. 8, an interval (A+C+D) between the first and second rows of holders is (3c+5b)(n-1) where n denotes the number of rows of holders.

Then, if the interval (A+C+D) between the first and second rows of holders is maintained as described above, the sunlight irradiation angle between the first and second rows of holders is maintained at 53° from the bottom surface so that a larger number of holders can be installed. The angle is an angle smaller than an angle 63° of right to sunshine between buildings under the architecture rule.

An installation state of the solar module holder according to the second embodiment of the present invention will be described.

As shown in FIGS. 9 to 12, after the supports 10 and 11 corresponding to concrete structures are buried at installation locations to be spaced apart from each other by an interval, the main frames 20 are installed to be inclined at 30° with respect to a line perpendicular to the ground surface by inserting the anchor bolts 15 installed in the supports 10 and 11 into the insertion holes 15a of the coupling pieces 15, and the main frames 20 are supported by vertically installing the auxiliary frames 30.

In this state, if the vertical parts 42 are coupled to a front surface of the main frame 20, the horizontal supports 40 including the inclined part 44 integrally formed with the vertical part 42 to be inclined downwards with respect to a line perpendicular to the ground surface and the inclined connecting part 46 integrally formed with the vertical part 42 and the inclined part 44 between the vertical part 42 and the inclined part 44 are sequentially assembled at the upper ends of the vertical parts 42 the same height.

Next, if the solar modules 50 are fixedly coupled to the upper surfaces of the inclined parts 44 of the horizontal supports 40, the solar modules 50 are installed on the upper surfaces of the inclined parts 44 of the horizontal supports 40 installed on the front surface of the main frames 20 installed in the supports 10 and 11 to be inclined rearwards at 20 to 30°, to be inclined at 60°.

Then, the installation interval of the solar modules 50 is five to six times as high as to the installation height of the solar modules 50 so that the shadow of an upper module does not hide a lower module.

Then, the vertical interval of the solar modules 50, that is, the interval between an upper module and a lower module is adjusted with reference to a meridian transit altitude of 67° (an average meridian transit altitude is 53°) at an altitude of 37°.

As shown in FIGS. 13 to 14, a plurality of rows of solar module holders are installed, the interval between the first row and the second row is maintained such that an angle obtained by extending the solar module 50 installed at upper ends of the main frames 20 corresponding to the second row and lower ends of the main frames 20 corresponding to the first row is at 30° to 53° with respect to the ground surface.

Another example of the multistage vertical solar module holder shown in FIGS. 15 and 16 is configured such that the main frame 140 and the auxiliary frame 150 are installed at an upper portion of one support 130 to install a solar module 170 having a small size, the horizontal support 160 is installed to maintain an interval from the front surface of the main frame 140 and to be inclined, and the solar module 170 is installed in the horizontal support 160, so that a solar module may be installed in a narrow place.

Although exemplary embodiments of the present invention have been mainly described, the spirit of the present invention is not limited thereto, but the constituent elements of the present invention may be changed or corrected without departing from the scope of the present invention to achieve the same objective and effect.

What is claimed is:

1. A multistage vertical solar module holder comprising:
a plurality of vertical frames vertically installed and spaced apart from each other with a first interval;
a plurality of transverse supports coupled in multiple stages, with a second interval, between the vertical frames in a transverse direction to the vertical frames;
a plurality of horizontal supports, each of the horizontal supports being coupled between the vertical frames below each of the transverse supports with a third interval and having rectangular shape perpendicular to the vertical frames;
a plurality of solar modules each of the solar modules being mounted between said each of the transverse supports and said each of the horizontal supports such that said each of the solar modules forms a first angle of 60° with the vertical frames and forms a second angle of 30° with the horizontal supports, the solar modules being arranged such that a shadow of a first solar module of the solar modules does not hide a second solar module of the solar modules located one stage below from the first solar module; and
inclination maintenance units, each of the inclination maintenance units including
a lower inclined bracket including
a vertical coupling piece coupled to a front surface of said each of the transverse supports by coupling means, and
a lower inclined piece integrally formed with the vertical coupling piece and extending from an end of the vertical coupling piece, the lower inclined piece forming the first angle of 60° with the vertical coupling piece and supporting an upper portion of said each of the solar cell modules,
an upper inclined bracket including
a horizontal coupling piece coupled to an upper surface of said each of the upper transverse supports by coupling means, and
an upper inclined piece integrally formed with the horizontal coupling piece and extending from an end of the horizontal coupling piece, the upper inclined piece being coupled to an upper end of said each of the solar module by coupling means,
an inner inclined bracket including
an inner horizontal piece coupled to an upper surface of said each of the horizontal supports by coupling means, and
an inner inclined piece integrally formed with the inner horizontal piece and extending from an end of the inner horizontal piece, the inner inclined piece forming the second angle of 30° with the inner horizontal piece and supporting a lower portion of said each of the solar cell modules, and
an outer inclined bracket including
an outer vertical piece coupled to a front surface of said each of the horizontal supports by coupling means, and
an outer inclined piece integrally formed with the outer vertical piece and extending from an end of the outer vertical piece, the outer inclined piece being coupled to a lower end of said each of the solar modules by coupling means.

2. The multistage vertical solar module holder of claim 1, wherein said each of the horizontal supports comprises:
an inner fixed part coupled between the vertical frames;
a pair of horizontal fixed parts of which first ends are coupled to front sides of the vertical frames; and
an outer fixed part coupled to second ends of the horizontal fixed parts.

3. The multistage vertical solar module holder of claim 1, wherein the second interval between the transverse supports are five to six times as high as the third interval between the transverse supports and the horizontal supports.

4. The multistage vertical solar module holder of claim 2 being installed with a fourth interval from an adjacent multistage vertical solar module holder,
wherein the adjacent multistage vertical solar module holder has a same structure as that of the multistage vertical solar module holder, and the fourth interval is calculated such that an angle of 53° is formed by a first virtual extension line and a second virtual extension line, and
wherein the first virtual extension line extends from the outer fixed part of the second solar module of the multistage vertical solar module holder to an inner fixed part of a first solar module of the adjacent multistage vertical solar module holder, the first solar module of the adjacent multistage vertical solar module holder corresponding to the first solar module of the multistage vertical solar module holder, and
the second vertical extension line extends from the outer fixed part of the second solar module of the multistage vertical solar module holder to an inner fixed part of a second solar module of the adjacent multistage vertical solar module holder, the second solar module of the adjacent multistage vertical solar module holder corresponding to the second solar module of the multistage vertical solar module holder.

5. A multistage vertical solar module holder comprising:
a pair of supports buried under a ground surface;
a pair of main frames installed at front portions of upper surfaces of the supports to be inclined at 20 to 30° rearwards with respect to a line perpendicular to the ground surface, respectively;
a pair of auxiliary frames of which lower portions and upper portions are fixed between rear portions of the upper surfaces of the supports and the main frames, for supporting the main frames, respectively;
a plurality of horizontal supports installed between the front surfaces of the main frames with a first interval and a first angle; and
a plurality of solar modules coupled to upper surfaces of the horizontal supports at 60°, with respect to the line perpendicular to the ground surface, respectively, and spaced apart from each other such that a shade of an upper module does not hide a lower module.

6. The multistage vertical solar module holder of claim 5, wherein the supports correspond to concrete structures, and the main frames and the auxiliary frames are fixedly coupled the supports by anchor bolts when the multistage vertical solar module holder is manufactured, and wherein coupling pieces having insertion holes into which the anchor bolts are inserted are fixed to lower ends of the main frames and the auxiliary frames, such that lower ends of the main frames are installed in the coupling pieces to be inclined at 20 to 30°, respectively and lower ends of the auxiliary frames are vertically installed.

7. The multistage vertical solar module holder of claim 5, wherein the horizontal supports comprises:
- a vertical part coupled to a front surface of the main frame installed in the support to be inclined rearwards at 20 to 30° with respect to the line perpendicular to the ground surface;
- an inclined part integrally formed with an upper end of the vertical part to be inclined downwards at 60° with respect to the line perpendicular to the ground surface; and
- an inclined connecting part integrally formed with the vertical part and the inclined part between lower ends of the vertical part and the inclined part.

8. The multistage vertical solar module holder of claim 5, wherein the first interval between the horizontal supports is five to six times as high as a height of a horizontal support.

9. The multistage vertical solar module holder of claim 5, wherein when a plurality of rows of solar module holders are installed in farmland such as a rice paddy or a field, a second interval between the first row and the second row is calculated such that an angle obtained by extending the solar module installed at upper ends of the main frames corresponding to the second row and lower ends of the main frames corresponding to the first row is at 30 to 53° with respect to the ground surface.

10. A multistage vertical solar module holder comprising:
- a support buried under a ground surface;
- a main frame installed at a front portion of an upper surface of the support such that the main frame is inclined rearwards at 20 to 30° with respect to a line perpendicular to the ground surface;
- an auxiliary frame of which a lower portion and an upper portion are fixed between a rear portion of the upper surface of the support and the main frame, for supporting the main frame;
- a plurality of horizontal supports installed on a front surface of the main frame with a same angle and interval; and
- a plurality of solar modules coupled to upper surfaces of the horizontal supports at 60° with respect to the line perpendicular to the ground surface, respectively, and spaced apart from each other such that a shade of an upper module does not hide a lower module.

* * * * *